JACOB EDSON.
Improvement in Driven Wells.

No. 115,452.

Patented May 30, 1871.

Witnesses:
James B. Gardner
Mauritz Andrén

Inventor:
Jacob Edson.
by his attorney M. Andrén

UNITED STATES PATENT OFFICE.

JACOB EDSON, OF BOSTON, MASSACHUSETTS.

IMPROVEMENT IN DRIVEN WELLS.

Specification forming part of Letters Patent No. 115,452, dated May 30, 1871.

I, JACOB EDSON, of the city of Boston, in the county of Suffolk and State of Massachusetts, have invented certain Improvements on "Strainers," of which the following is a specification:

Nature and Objects of the Invention.

The nature of my invention relates to an improved strainer for pumps, made of perforated corrugated sheet metal, surrounding the perforated draw-pipe, for the purpose of clearing the water that is drawn from the grit and impurities contained in the earth by which the strainer is surrounded.

Figure 1:
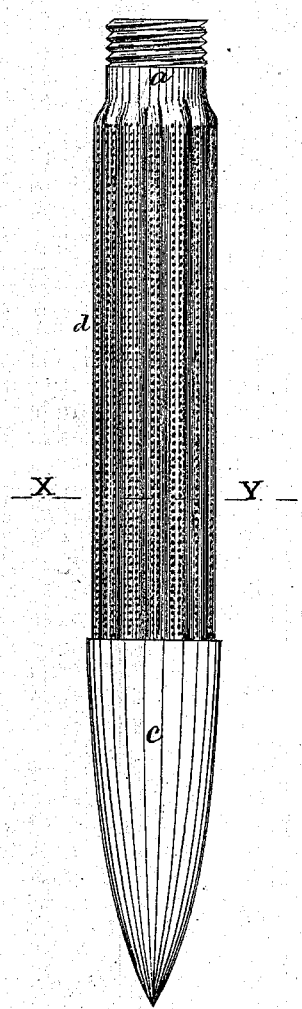
Figure 2:
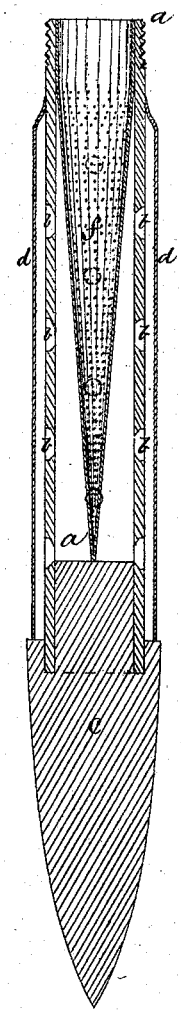
Figure 3:
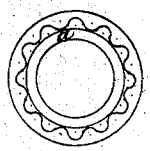
Figure 4:
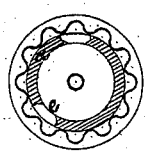

On the drawing, Figure 1 is a side elevation; Fig. 2 is a central longitudinal section; Fig. 3 is a ground plan; and Fig. 4 is a cross-section, over the line $x\,y$, taken on Fig. 1.

Similar letters refer to similar parts wherever they occur on the drawing.

It is of great importance for the well-working of the different parts of a pump to have a perfect strainer that will prevent the impurities and gritty substances from the earth passing up into the suction-pipe, and at the same time prevent the strainer from being clogged up with the fine mud and slime that frequently exists in the earth through which the water is drawn.

To accomplish these purposes I construct my strainer as follows: $a$ on the drawing is the suction-pipe, perforated with a number of holes, $b\,b\,b$, made larger in diameter on the outside of the pipe and tapering toward the inside of said pipe, as shown in Figs. 2 and 4. The lower end of the suction-pipe is closed up by means of a cast-iron pointer, $c$, welded firmly onto the suction-pipe by putting said pipe into the mold and casting the iron around and inside the suction-pipe, as shown in Fig. 2. The upper end of the suction-pipe $a$ is cut with a screw-thread so as to be easily connected with any length of pipes that may be needful. The suction-pipe $a$ is surrounded by the strainer $d$, made of perforated and corrugated sheet metal, as shown. The metal employed for this purpose is first perforated with as small holes as can practicably be made. When the small holes are punched through the metal there arise "burrs" on the under side of the metal. The plate is then rolled and corrugated by being passed through dies or rollers, when the burrs partially close up the holes, and thus diminish their size, so as to make an efficient strainer. The metallic perforated and corrugated plate is then soldered together lengthwise after being bent like a fluted pillar, and afterward sprung over the suction-pipe $a$, as shown in Figs. 1, 3, and 4. By this arrangement the suction-pipe is strengthened materially. The strainer $d$ is soldered onto the top of the suction-pipe, as shown in Fig. 1. The corrugations of the strainer $d$ form upright channels around the suction-pipe $a$, whereby the admittance of water to the said pipe $a$ is greatly facilitated. The holes $b\,b\,b$ are made larger in diameter on the outside so as to reach two channels or grooves on the strainer, as shown at $e$, Fig. 4, and made tapering inward, so as to obtain sufficient strength to stand sundry twistings or blows that may be occasioned. For the purpose of obtaining a more efficient or double strainer I place, at option, a conical-shaped strainer, $f$, made of similar perforated metal, not corrugated, inside the suction-pipe $a$, as shown in Fig. 2. The upper end of this conical strainer $f$ fits closely onto the inside of the suction-pipe $a$, as shown. The object of this secondary strainer is to prevent certain grit or impurities that may come into the suction-pipe through the corrugated strainer $d$ from entering the upper part of the suction-pipe. The grit or mud that possibly may enter through the holes $b\,b\,b$ into the suction-pipe $a$ will fall to the bottom of said pipe, and, therefore, not obstruct the flow of the water into the upper part of the conical strainer $f$. The action of the water drawn through the conical strainer $f$ tends to wear off certain particles that have passed through the corrugated strainer $d$, and, by thus diminishing their size, prevents the valves in the pump from being damaged as they are allowed to pass up through the pump.

Heretofore it has been a great difficulty in producing sheets perforated with holes small enough to prevent grit from entering; but, by rolling the sheets after they are perforated, I am able to obtain holes of any required size and of the required form—viz., smaller on the outside than within.

In other strainers the trouble has been, if holes of the required size could be made, enough of them could not be made on an uncorrugated plate to afford suitable supply of water without making the strainer too large to drive easy, or so long as to endanger one or the other end of said strainer from being above or below the stratum of earth that supplies the water.

Having thus fully described the nature, construction, and operation of my invention, I wish to secure by Letters Patent and claim—

The combination of the suction-pipe $a$, holes $b\ b\ b$, the pointer $c$ welded to the suction-pipe, and the corrugated perforated strainer $d$, when all are arranged and combined substantially as set forth and described.

JACOB EDSON.

Witnesses:
 ALBAN ANDRÉN,
 FRANCIS GARDNER.